(12) United States Patent
Andrus

(10) Patent No.: US 6,409,252 B1
(45) Date of Patent: Jun. 25, 2002

(54) TRUCK TRAILER DRAG REDUCER

(76) Inventor: Paul Guy Andrus, 46 Wiltshire Place, Ancaster On. (CA), L9K 1M5

( * ) Notice: Subject to any disclaimer, the term of this patent is extended or adjusted under 35 U.S.C. 154(b) by 0 days.

(21) Appl. No.: 09/960,781

(22) Filed: Sep. 24, 2001

(51) Int. Cl.[7] .............................................. B62D 35/00
(52) U.S. Cl. ................................ 296/180.4; 296/180.1
(58) Field of Search ........................... 296/180.4, 180.5, 296/180.1

(56) References Cited

U.S. PATENT DOCUMENTS

| | | | |
|---|---|---|---|
| 4,006,932 A | * | 2/1977 | McDonald |
| 4,236,745 A | * | 12/1980 | Davis |
| 4,601,508 A | * | 7/1986 | Kerian |
| 4,702,509 A | * | 10/1987 | Elliott, Sr. |
| 4,978,162 A | * | 12/1990 | Labbe ...................... 296/180.2 |
| 5,058,945 A | * | 10/1991 | Elliott, Sr. et al. ....... 296/180.5 |
| 5,236,347 A | * | 8/1993 | Andrus ..................... 296/180.4 |
| 5,823,610 A | * | 10/1998 | Ryan et al. .............. 296/180.4 |
| 6,309,010 B1 | * | 10/2001 | Whitten ................... 296/180.4 |

* cited by examiner

Primary Examiner—Joseph D. Pape

(57) ABSTRACT

The invention comprises an inflatable bag mounted on each of the rear trailer doors of a standard tractor-trailer unit. The optimum aerodynamic shape of the bags with stable flat external surfaces for air to pass over is created by a series of internal cords extending horizontally in a radial array from the medial edge of the base of each bag to its corresponding lateral surface, and vertically form the top to the bottom surfaces of each bag.

4 Claims, 4 Drawing Sheets

TRUCK TRAILER DRAG REDUCER

BACKGROUND OF THE INVENTION

The invention relates to add-on aerodynamic air deflectors for the rear surface of a transport trailer. Inflatable drag reducers have been described (e.g. McDonald (1977) U.S Pat. No. 4,006,932, Ryan (1998) U.S. Pat. No. 5,823,610), and are more practical than rigid versions (e.g. Lechner (1994) U.S. Pat. No. 5,375,903, Switlik (1996) U.S. Pat. No. 5,498,059, Boivin (2001) U.S Pat. No. 6,257,654 B1), because inflatables are light-weight and collapsible to a very thin state so as not to interfere with complete trailer door opening which is important because there is limited room to maneuver at most loading docks. However, given that the standard long-haul trailer in North America is a double door configuration, this requires that the drag reducer have two separate halves meeting medially along a planar surface when inflated. The external surfaces over which the airstream passes should also be planar for minimum turbulence creation and maximum drag reduction. Inflatables naturally tend towards a spherical shape without an internal means of controlling the position of the surface. The present invention describes a novel configuration of internal cords that allows the two bags to meet neatly along a common plane, while having grossly flat external surfaces that are held firmly in place even in heavy crosswinds.

To achieve auto-inflation the present invention employs a flexible air-scoop extending above the roofline from each bag to capture air pressure from the over-passing air stream. Similar such means have been used for inflation purposes in prior art (e.g. McDonald (1977) U.S. Pat. No. 4,006,932, Keedy (1979) U.S. Pat. No. 4,142,755, Lechner (1994) U.S. Pat. No. 5,375,903).

To achieve bag stability and avoid surface flailing during inflation and deflation, an elastic cord oriented in a circular fashion on the medial surface of each bag is employed as disclosed in Andrus (1993) U.S. Pat. No. 5,236,347. The present disclosure further teaches that the placement of such an elastic cord for a double bag configuration is best on the medial surface of each bag thereby drawing the bags together and away from traffic during conditions of partial inflation.

SUMMARY OF THE INVENTION

The invention solves the problem of creating an aerodynamically optimal shape with flat surfaces from a soft inflatable material, as well as the problem of the inherent lateral instability of a double bag configuration. The novel aspect disclosed herein is a network of internal cords consisting of a radially oriented array of horizontal cords that stabilize and flatten the lateral surfaces of the bags, and a parallel array of vertical cords that flatten the upper and lower surfaces.

BRIEF DESCRIPTION OF THE DRAWINGS

FIG. 3 is a top view showing the 5 columns of horizontal cords splaying out radially, and the 10 vertical cords per bag end-on.

DETAILED DESCRIPTION OF THE PREFERRED EMBODIMENT

Figure 1:
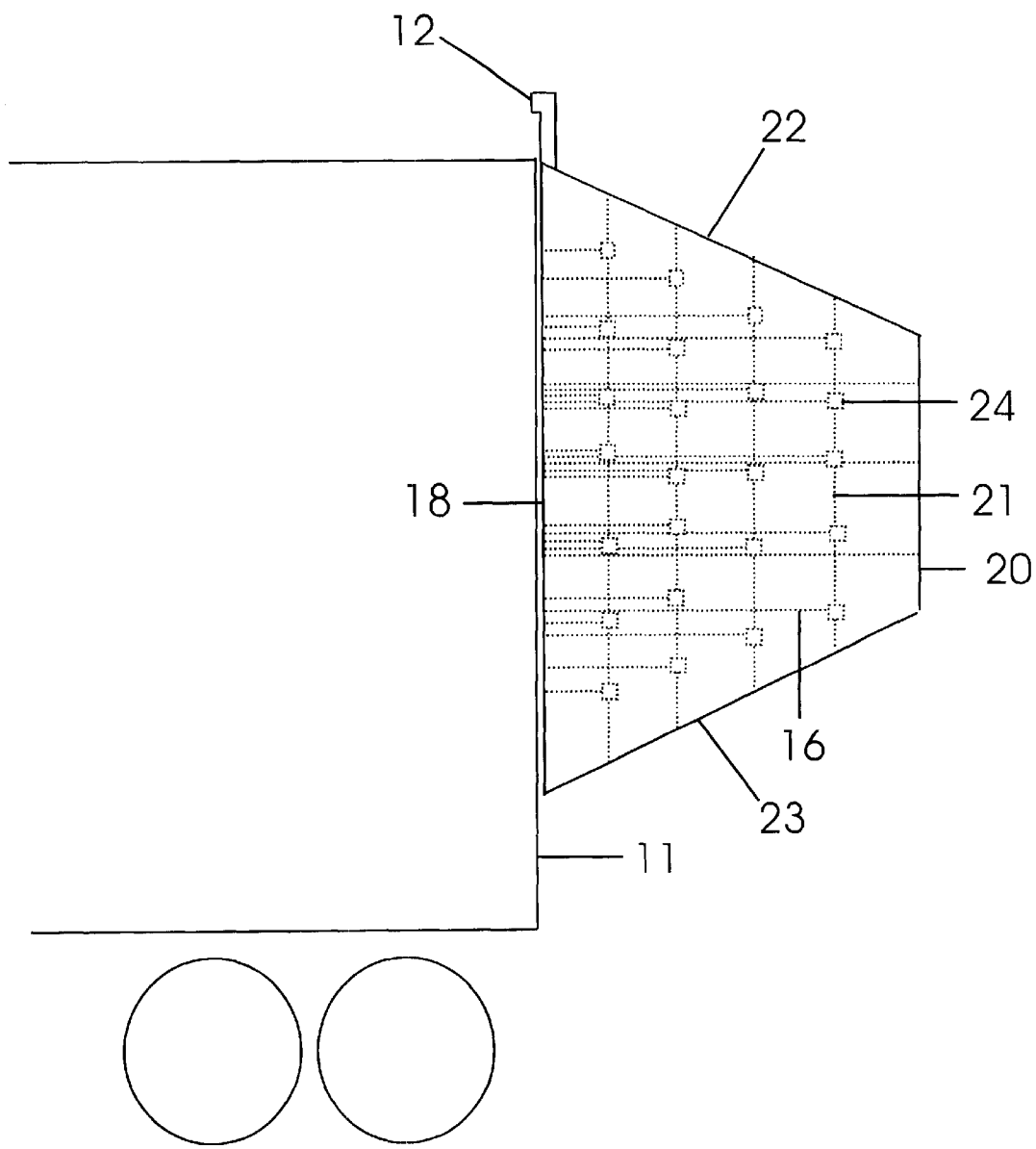
FIG. 1 is a side view of a trailer with the invention mounted.
Figure 2:
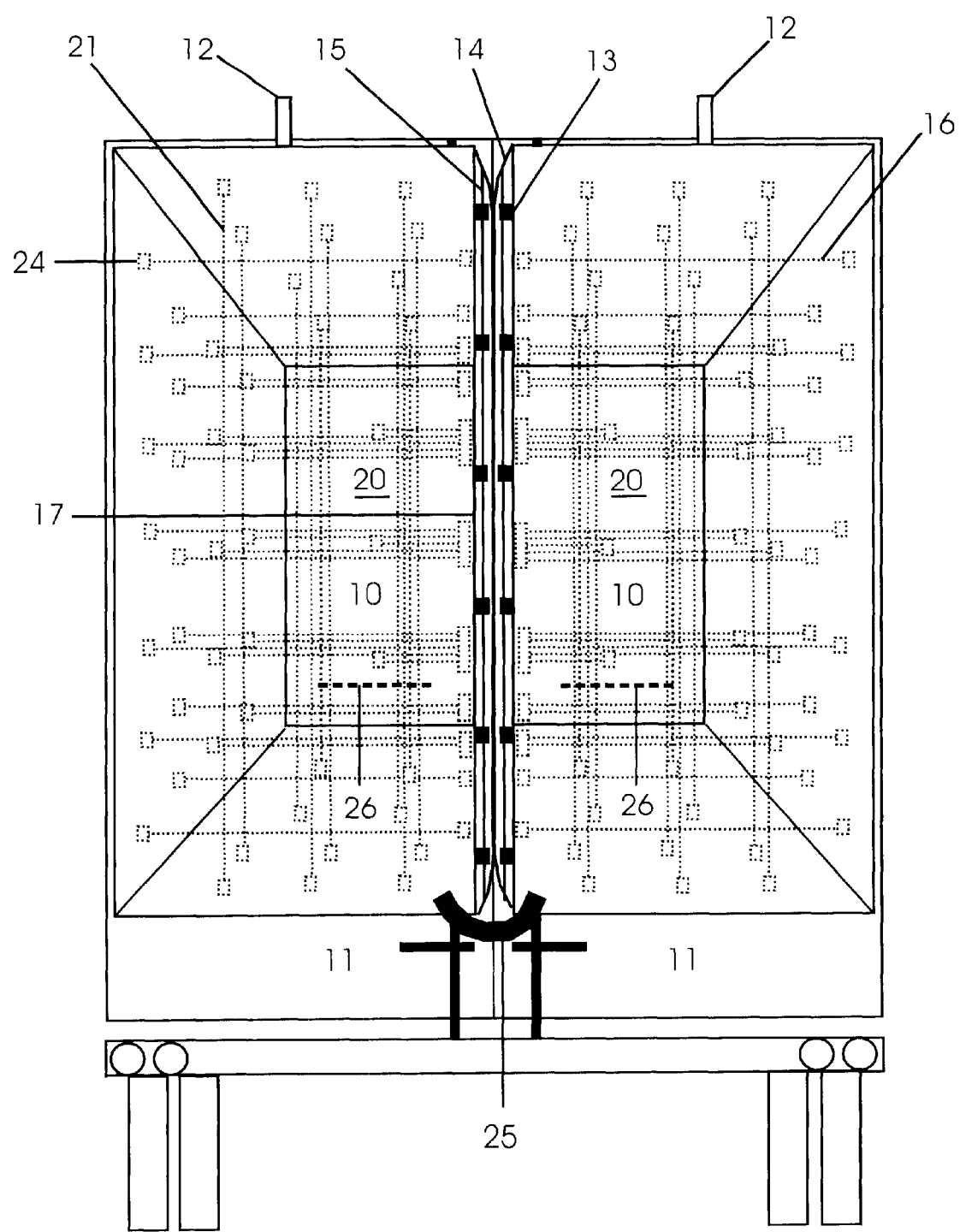
FIG. 2 is a face-on view showing the internal cords.
Figure 3:
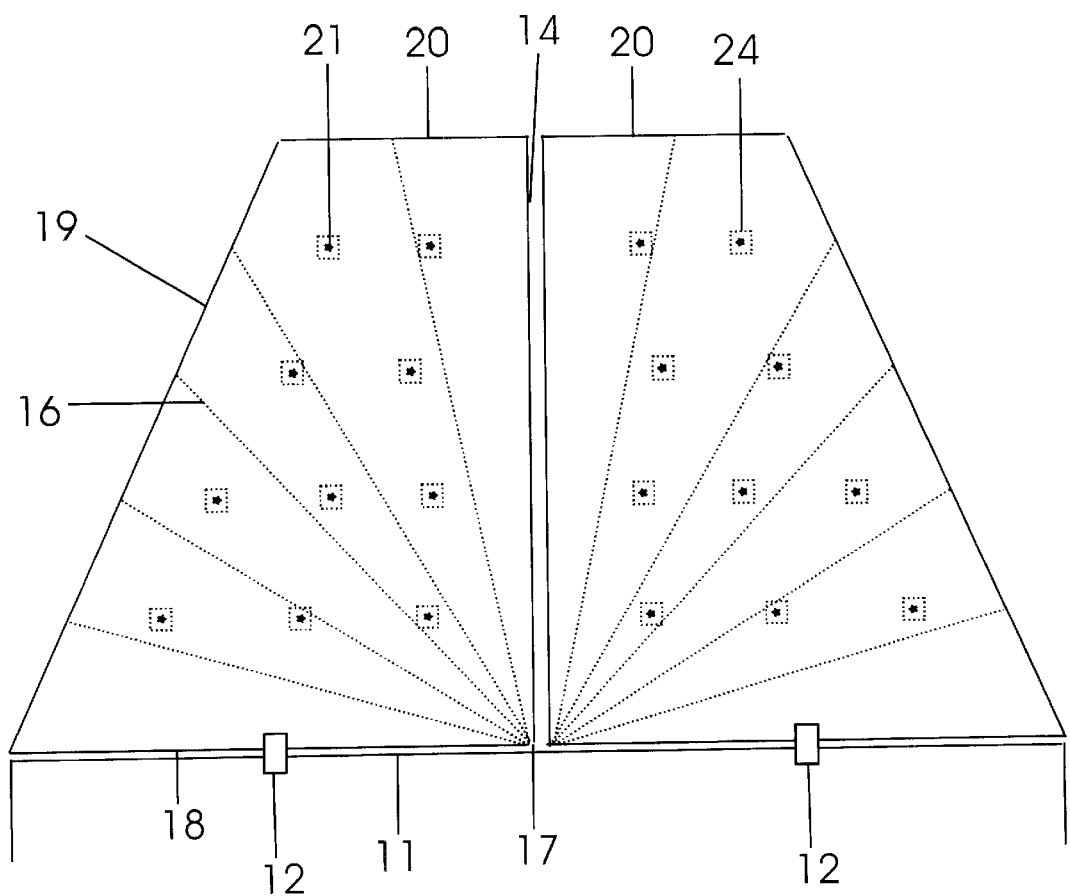
Figure 4:
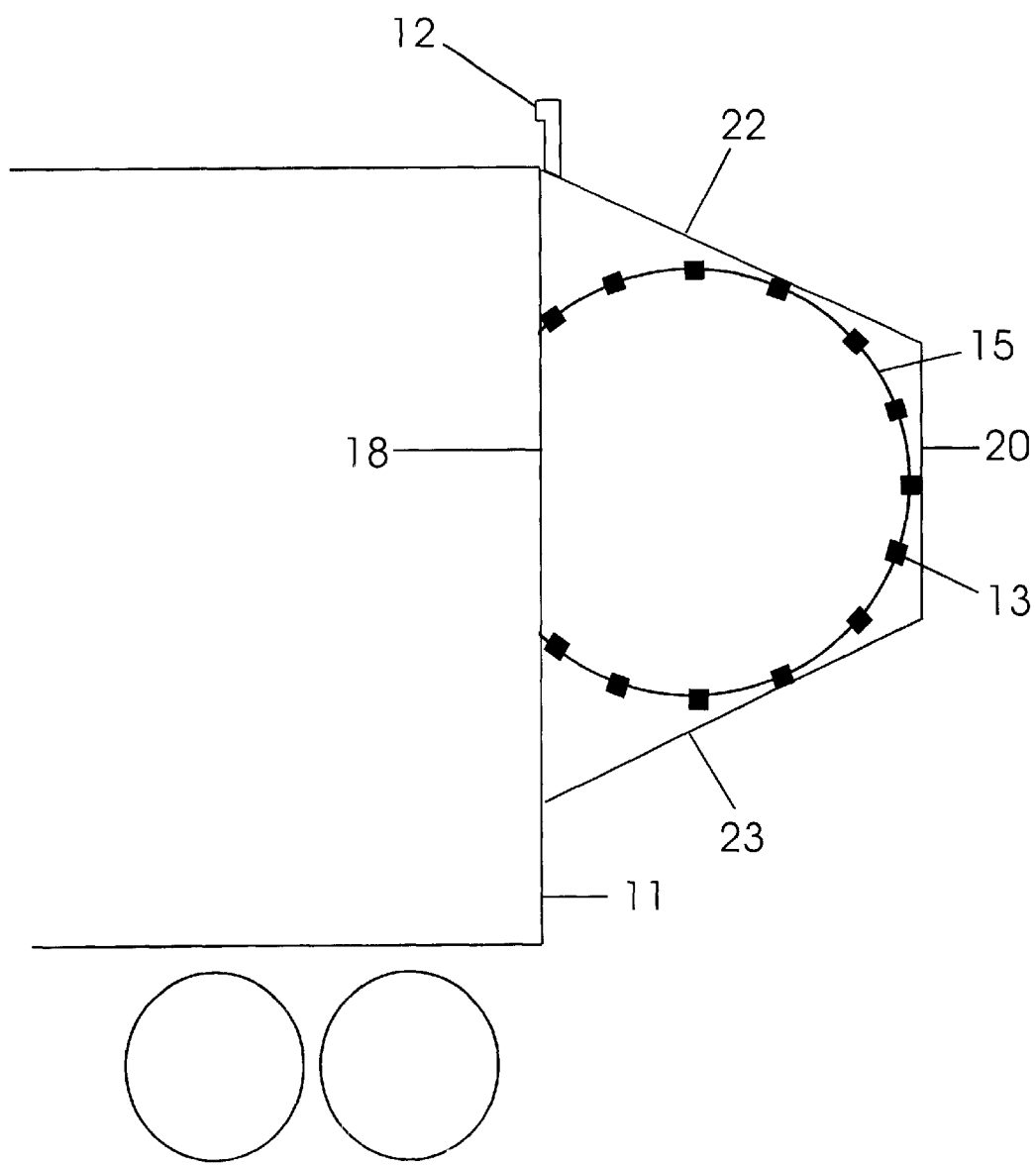
FIG. 4 shows the medial surface of one half of the invention with the elastic recoil system exposed.

Each half of the invention is a fully enclosed bag 10 mounted permanently onto each of the rear doors 11 of the trailer. A flexible rubber air-scoop 12 feeds air into each bag to provide inflation pressure with trailer motion. A circular series of outside patches 13 on the medial side 14 of each bag 10 houses an elastic cord 15 that functions to draw the bags 10 together by contracting when inflation is only partial, thereby maintaining stability and preventing lateral flailing of the bags. An array of horizontal inelastic cords 16 originate from the medial edge 17 of the base 18 and splay out to insert at equally spaced points on the inner surface of the lateral side 19 and trailing surface 20. There are twenty-seven horizontal cords 16 per bag 10, twenty-four on the lateral side 19 and three on the trailing surface 20. An array of vertical inelastic cords 21 connects the upper surface 22 and lower surface 23 of each bag 10, and intersects with the horizontal cords 16. The horizontal cords 16 and the vertical cords 21 are attached to inside patches 24 that are heat sealed to the inside surface of the bags 10. A rubber tube 25 that easily disconnects in its middle feeds air from one bag to the other in the event of partial air scoop 12 failure or a significant surface hole in one bag so as to maintain relatively equal bag pressure and thereby symmetry of drag reducer shape. Each bag has a zipper 26 which can be undone to allow rapid deflation at the loading dock. Air leakage through the closed zippers 26 during operation also serves to bleed unnecessary pressure from the bags so that the seams and attachment points are not unduly loaded. This occurs because air leaks between the teeth of the zipper even when it is closed. At 60 mph airspeed, the available static head of air pressure is about 2.5 inches of water or 0.1 psi. half of which is lost through the closed zippers 26 leaving about 0.05 psi. The bag's surface tension will overcome the tension of the elastic cord 15 and allow full inflation as low as 0.025 psi. At 0.05 psi (typical highway operating conditions), each of the inelastic cords is loaded with about 7 pounds tension.

What is claimed is:

1. An inflatable drag reducer adapted to be mounted on the rear doors of a standard transport trailer, said drag reducer comprising a pair of flexible enclosed bags with one bag mounted onto each of the two trailer doors, said bags having a base surface adjacent to said trailer doors, said bags having adjacent medial surfaces, said bags having lateral, upper, and lower surfaces over which air passes during forward motion of said trailer, said bags containing an array of internal inelastic cords extending horizontally from the medial edge of said base surfaces to said lateral surfaces at equally spaced points, said bags containing a second array of internal inelastic cords extending vertically from said upper surfaces at equally spaced points to said lower surfaces at equally spaced points, such that upon inflation said drag reducer assumes a pyramidal shape with said lateral, upper and lower surfaces being substantially planar.

2. An inflatable drag reducer as recited in claim 1 wherein a flexible tubular member extends between the bags, such that when the air pressure in one bag is greater that the air pressure in the other bag, then air shall freely pass from the higher pressure bag to the lower pressure bag.

3. An inflatable drag reducer as recited in claim 1 wherein each bag has a zipper in one of its surfaces, such that under typical operating conditions, during which the drag reduer is inflated and the zippers are closed, approximately half of the available static head of air pressure is lost through said zippers.

4. An inflatable drag reducer is recited in claim 1 wherein an elastic cord is mounted in a circular orientation onto said medial surfaces of each bag, such that when said bags are only partly inflated, said elastic cords draw the bags medially toward one another.

* * * * *